United States Patent
Haga

[19]

[11] Patent Number: 5,903,969
[45] Date of Patent: *May 18, 1999

[54] FLOATING MAGNETIC HEAD AND METHOD FOR PRODUCING SAME

[75] Inventor: Shuichi Haga, Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/766,005

[22] Filed: Dec. 13, 1996

Related U.S. Application Data

[62] Division of application No. 08/534,821, Sep. 27, 1995, abandoned.

[30] Foreign Application Priority Data

Sep. 30, 1994 [JP] Japan ..................................... 6-238220
Apr. 27, 1995 [JP] Japan ..................................... 7-104265

[51] Int. Cl.$^6$ ............................... G11B 5/127; G11B 5/60
[52] U.S. Cl. ..................................... 29/603.18; 29/603.01; 29/603.15; 29/603.07; 29/603.16; 360/103
[58] Field of Search ..................................... 360/103, 120, 360/122; 428/216, 408; 427/523, 524, 527, 548; 29/603.01, 603.03, 603.07, 603.16, 603.14, 603.15, 603.18

[56] References Cited

U.S. PATENT DOCUMENTS

| | | | |
|---|---|---|---|
| 5,008,732 | 4/1991 | Kondo et al. | 357/67 |
| 5,159,508 | 10/1992 | Grill et al. | 360/103 |
| 5,336,550 | 8/1994 | Ganapathi et al. | 428/216 |
| 5,388,017 | 2/1995 | Franco et al. | 360/103 |

*Primary Examiner*—Ponnathapura Achutamurthy
*Assistant Examiner*—P. Ponnalun
*Attorney, Agent, or Firm*—Hill & Simpson

[57] ABSTRACT

A floating magnetic head device in which a slider carrying a magnetic head is supported by a supporting member. An intermediate layer composed of elements of the groups III or IV of the Periodic Table and an upper layer composed of hard carbon are sequentially deposited at least on the surface of slide rails formed on the major surface of the slider operating as a floating surface. It is possible with the floating magnetic head device to reduce the abrasion and sticking between the slider and the magnetic disc for improving abrasion resistance and CSS durability of the slider and the magnetic disc as well as durability and operational reliability of the magnetic head and the magnetic disc as articles of commerce.

6 Claims, 3 Drawing Sheets

FLOATING MAGNETIC HEAD AND METHOD FOR PRODUCING SAME

This is a division, of application Ser. No. 08/534.821 filed Sep. 27, 1995 now abandoned.

BACKGROUND OF THE INVENTION

This invention relates to a floating magnetic head device advantageously used for writing or reading information signals on of rom a magnetic disc, also referred to herein as a hard disc. The invention also relates to a method for producing the floating magnetic head device.

The hard disc device, built into e.g., a computer for recording and reproducing the information, naturally includes a magnetic disc as an information recording medium and a magnetic head for recording and reproducing the information on or from the disc.

For avoiding damage to the magnetic head due to contact with the magnetic disc surface, a so-called contact start stop (CSS) floating magnetic head is in use as the magnetic head. The CSS type floating magnetic head is in surface contact with the magnetic disc surface during start and stop and is floated with an extremely small distance (flying height) from the magnetic disc surface by an air current generated on the disc surface during high-speed rotation of the disc.

The floating type magnetic head device includes a slider carrying a magnetic head, a gimbal spring in the form of a flexible plate spring secured to the slider, a suspension in the from of a plate spring having its one end secured to this gimbal spring and an arm mounted via a base plate to the other end of the suspension. The slider mounting end of the gimbal spring has a dimple providing a protuberance for limiting the floating distance of the slider carrying the magnetic head from the disc surface.

The slider is a substrate formed e.g., of $Al_2O_3$—TiC and is usually prepared by machining using a grindstone. The slider is made up of an air inlet groove for causing the magnetic disc to be floated with a small flying height from the magnetic disc in a stabilized floating state, a pair of slide rails formed on both sides of the air inlet groove and a magnetic head element fabricated by a vacuum thin-film forming technique on the slide rails on an end face thereof directed towards the air inlet end.

Each slide rail has an air lubricating surface, an air inlet end of which has a small taper which is a moderately inclined surface with a gradient of not more than 1°. The slider is floated under an air pressure generated on each air lubricating surface. The tapered portion is responsible to a greater extent for the generation of the air pressure on the air lubricating surface.

The magnetic head has a lower-layer core on the substrate, a conductor coil and an upper layer core formed on the lower layer core via an insulating film. The upper layer core and the lower layer core are magnetically coupled to each other via a back gap and a magnetic gap, with the conductor coil in-between, for constituting a magnetic circuit.

With the above-described floating magnetic head, the slider is contacted with the magnetic disc surface during start and stop and is slid on the magnetic disc surface immediately after start and immediately after stop. Thus the floating magnetic head suffers from the problem of low CCS durability. There is also a problem that powder debris generated due to sliding contact between the two surfaces becomes affixed to the slider surface to cause premature deterioration of the floating performance of the slider.

Thus it may be envisaged to use an upper layer of hard carbon typified by diamond-shaped carbon on the slider surface. The diamond-shaped carbon can be formed into a film at lower temperatures. In addition, the diamond-shaped carbon exhibits self-lubricating properties when in the state of a thin film and has a low frictional coefficient and high hardness on being formed into a film, so that it is superior in abrasion resistance. Thus, by forming the upper layer of hard carbon, it becomes possible to prevent abrasion which otherwise tends to be produced between the slider surface and the magnetic disc surface.

Recently, a demand has been raised towards high density recording on the hard disc. For meeting this demand, it is necessary to reduce tie flying height to as small a value as possible. For suppressing the spacing loss, the upper layer needs to be of an extremely reduced thickness, while the upper layer needs to exhibit sufficient adhesion with respect to the slider. However, the upper layer formed of hard carbon, especially diamond-shaped carbon, has a higher internal stress and poor adhesion with respect to the slider. On the other hand, the smaller the thickness of the upper layer, the more significant is the lowering of adhesion thereof with respect to the slider.

OBJECT AND SUMMARY OF THE INVENTION

It is therefore an object of the present invention to provide a floating magnetic head and a method for producing the same, in which the abrasion and sticking between the slider and the magnetic disc may be reduced for improving resistance against abrasion and CSS durability as well as for improving the durability of the product and hence the operational reliability of the magnetic head and the magnetic disc.

The present invention is directed to a floating magnetic head in which a slider carrying a magnetic head is supported by a supporting member, the magnetic head is in surface contact with the surface of the magnetic head during start and stop, and in which, during high-speed rotation of the magnetic disc, the magnetic disc is run as it is floated a small distance from the magnetic disc surface under an air current generated on the magnetic disc surface.

According to the present invention, the floating magnetic head device is constituted by sequentially depositing an intermediate layer and an upper layer composed of hard carbon at least on the surface of slide rails formed on the major surface of the slider operating as a floating surface.

The material of the intermediate layer is preferably an element of the groups III or IV or a silicon-based material. It is specifically preferred to employ at least one selected from among Si, B, Al and C or at least one selected from among $SiO_2$, SiC, SiO and $Si_3N_4$.

A specific preferred example of the slider material is $Al_2O_3$—TiC.

Since the hard carbon is preferably of the Vickers hardness of not less than 1000, it is preferably diamond-shaped carbon.

The intermediate film is preferably not less than 5 Å and not more than 100 Å, while the upper layer is preferably not less than 10 Å and not more than 200 Å. If the thickness of the intermediate layer or the upper layer is less than 5 Å or 10 Å, respectively, sufficient frictional characteristics of the slider surface cannot be maintained thus lowering electro-magnetic transducing characteristics. If the thickness of the intermediate layer or the upper layer is larger than 100 Å or 200 Å, respectively, the spacing loss is increased thus again lowering electro-magnetic transducing characteristics.

The present invention is also directed to a method for producing the floating magnetic head device including the steps of supplying an ionized $H_2$ gas or an ionized inert gas to at least the surfaces of slider rails on the major surface of the slider constituting the floating surface of the slider for etching the slider rail surface, forming the intermediate layer by a thin film forming technique, etching the surface of the intermediate layer again using an inert gas for depositing the upper layer on the intermediate layer by a thin film forming technique.

An illustrative example of the inert gas employed for etching is Ar, while illustrative examples of thin film forming techniques for forming the intermediate layer and the upper layer include the plasma CVD, vacuum deposition, vacuum sputtering and ion plating methods.

With the floating magnetic head device according to the present invention, an intermediate layer composed of elements of the groups III or IV of the Periodic Table and an upper layer composed of hard carbon are sequentially deposited at least on the surface of slide rails formed on the major surface of the slider operating as a floating surface. The intermediate layer leads to improved adhesion between the upper layer and the film-forming portion on the slider surface thus reducing the flying height and raising the recording density. On the other hand, when the slider is slid on the magnetic disc surface immediately after start or stop, the abrasion or sticking liable to be produced on the magnetic disc surface is diminished significantly.

For fabricating the magnetic head device, ionized $H_2$ gas or an ionized inert gas is supplied to the film-forming portion on the slider surface for etching, and the intermediate layer is subsequently formed by the thin film forming technique. The intermediate film surface is again etched using the $H_2$ gas or the inert gas for depositing the upper layer. Since the film-forming portion is cleaned and activated by the pre-processing employing the $H_2$ gas or the inert gas, and the intermediate layer and the upper layer are formed in this state, it becomes possible to further improve adhesion between the film-forming portion and the upper layer.

According to the present invention, the abrasion and the sticking between the slider and the magnetic head are diminished for improving resistance against abrasion and CSS durability therebetween, while the durability of the magnetic head and the magnetic disc as the articles of commerce may be improved further for improving the operational reliability of the floating head device.

DESCRIPTION OF THE INVENTION

Figure 1:
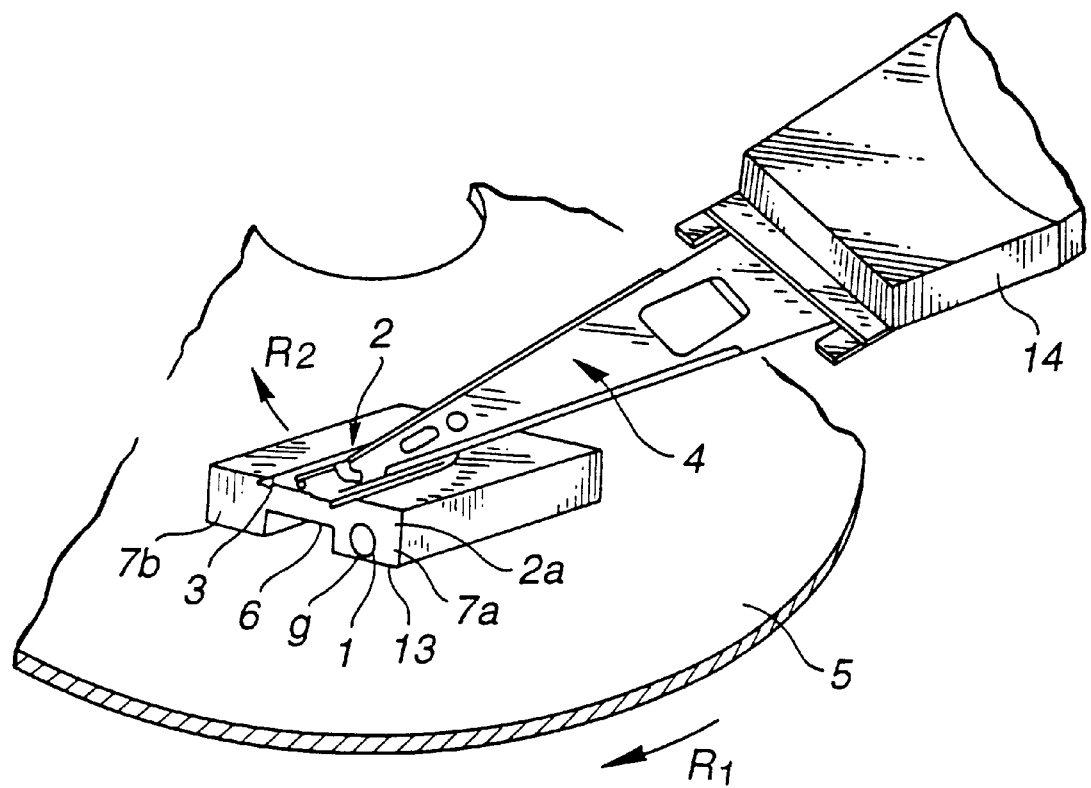
FIG. 1 is a schematic perspective view showing a floating magnetic head according to the present invention.

Referring to the drawings, a floating magnetic head device and a method for producing the same according to preferred embodiments of the present invention will be explained in detail.

The floating magnetic head according to the present invention includes a slider 2 carrying thereon a magnetic head element 1, a gimbal spring 3 mounted on the slider 2 for buffering an external force, a suspension 4 for supporting the slider 2 via the gimbal spring 3 and an actuator 14 connected to an end of the suspension 4 for running the suspension 4 in rotation, as shown in FIG. 1.

Figure 2:
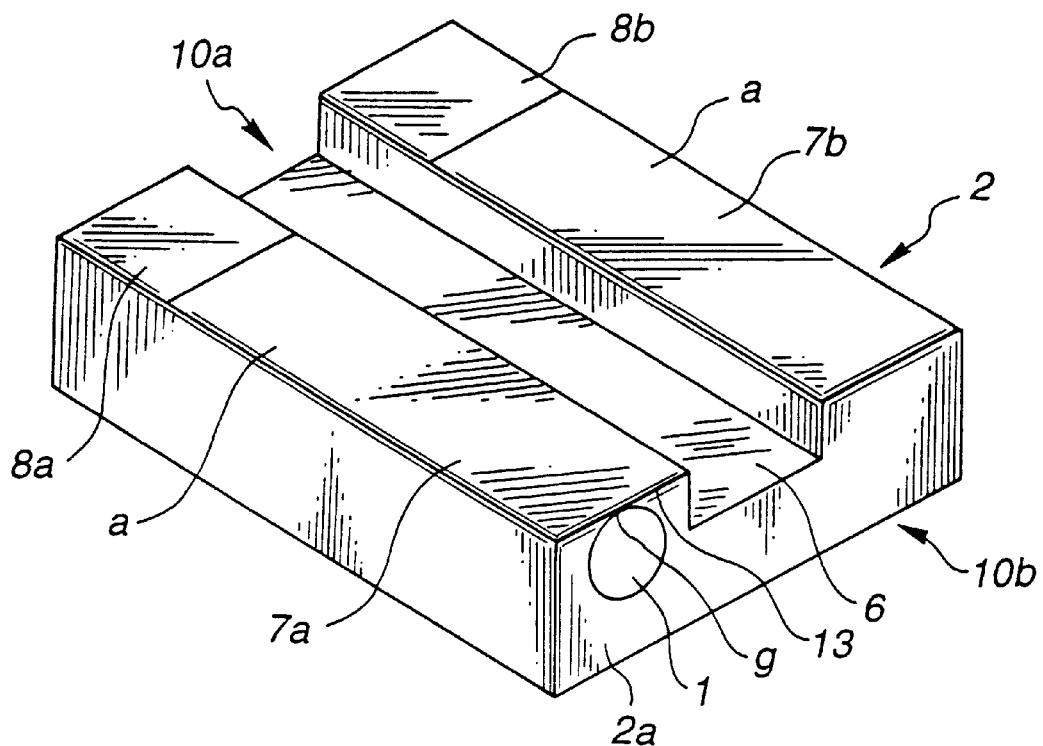
FIG. 2 is a schematic perspective view showing a slider as a constituent element of the floating magnetic head.

The slider 2 is formed of $Al_2O_3$—TiC, which is a non-magnetic electrically conductive material, and has an air inlet groove 6 on its surface facing a magnetic disc 5 for floating the slider 2 with respect to the magnetic disc 5 with a minor distance (flying height) in a stable floating attitude, as shown in FIG. 2. The air inlet groove 6 is formed along the length of the slider 2 with a groove thickness on the order of 0.4 to 100 $\mu$m. A pair of slide rails 7a, 7b are protuberantly formed along the length of the slider 2 on both sides of the air inlet groove 6. The slider 2 may be formed of non-magnetic ferrite materials, SiC—, $ZrO_2$— or $CaTiO_2$ based materials.

An air lubricating surface a is formed on each of the slide rails, while tapered portions 8a, 8b, which are extremely moderately inclined surfaces with an angle of inclination of not more than 1°, are formed at air inlet ends 10a of the air lubricating surfaces. The slider 2 is floated under an air pressure produced on the air lubricating surfaces a. Such generation of the air pressure on the air lubricating surfaces a is ascribable to a greater extent to these taper portions.

Figure 3:
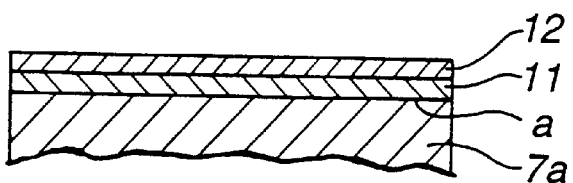
FIG. 3 is a cross-sectional view showing the state of the slider surface.

On the air lubricating surface a of each of the slide rails 7a, 7b, an intermediate layer 11 formed of elements of the groups III or IV of the Periodic Table or a silicon-based material and an upper layer 12 formed of diamond-shaped carbon are sequentially layered, as shown in particular in FIG. 3. The thickness of the intermediate layer 11 is preferably 5 to 100 Å, while that of the upper layer 12 is preferably 10 to 200 Å. If the thickness of the intermediate layer 11 or that of the upper layer 12 is less than 5 Å or 10 Å, respectively, sufficient friction characteristics of the surface of the slider 2 cannot be maintained, such that electromagnetic transducing characteristics are lowered. If the thickness of the intermediate layer 11 or that of the upper layer 12 is larger than 100 Å or 200 Å, respectively, the spacing loss is increased such that electro-magnetic transducing characteristics are similarly lowered.

The intermediate layer 11 is preferably formed of Si, B, Al, C, $SiO_2$, SiC, SiO or $Si_3O_4$. The diamond-shaped carbon, used as the material for the upper layer 12, is used as a preferred example of hard carbon since the diamond-shaped carbon exhibits a wide peak in the vicinity of 1520 to 1560 $cm^{-1}$ as measured by Raman spectrometry and has a Vickers hardness of not lower than 1000 $Kgmm^{-2}$.

The magnetic head element 1 is formed on a lateral surface of the slider 2, that is on a lateral surface 2a thereof extending at right angles to the slide rail 7a, so that its magnetic gap g faces a lateral edge 13 of the slide rail 7a or the lateral surface 2a. The magnetic head element 1 may be exemplified by a bulk magnetic head, a monolithic magnetic head unified to the slider 2, or a thin-film magnetic head. Of these, the thin-film magnetic head is preferred since a magnetic thin film of high magnetic permeability and high saturation density may be employed and the head may be miniaturized with high accuracy.

With the above-described floating magnetic head device, the slide rails 7a, 7b on the slider 2 are kept in contact with the surface of the magnetic disc 5 at the start time. The slide rails 7a, 7b are floated under an air stream generated by rotation of the magnetic disc 5 in a direction indicated by arrow R1 in FIG. 1. Thus the magnetic head is floated with a pre-set flying height from the surface of the magnetic disc 5 for information recording/reproduction. The magnetic disc 5 is rotated at this time in the direction indicated by arrow R1, while the slider 2 supported by the suspension 4 is turned in the direction indicated by arrow R2 by the actuator 14. When the magnetic disc 5 is stopped, the slide rails 7a, 7b of the slider 2 are lowered onto and contacted with the surface of the magnetic disc 5.

For forming the intermediate layer 11 and the upper layer 12 on the air lubricating surfaces a of the slide rails 7a, 7b of the slider 2, the slider 2 is mounted in a vacuum chamber, not shown. The vacuum chamber is evacuated to the background vacuum of the order of $2 \times 10^{-4}$ Pa and subsequently an argon gas is introduced into the vacuum chamber in a controlled amount for setting the pressure on the order of 0.2 Pa.

An inert gas, such as $H_2$ or Ar, is ionized, with a making power of 200 W, and supplied in this state to each air lubricating surface a, for plasma-etching the air lubricating surfaces a for cleaning and activating the air lubricating surfaces a. The intermediate layer 11 of $SiO_2$ is then formed by vacuum sputtering to a film thickness of 5 to 100 Å. The surface of the intermediate layer 11 is again plasma-etched, under the same conditions as described above. The upper layer 12 formed of diamond-shaped carbon is deposited on the intermediate layer 11 by the plasma CVD method using a hydrocarbon-based gas, herein an ethylenic gas, such as methane, ethylene, acetylene or benzene, with moderate hydrogenation.

As the thin film forming technique for forming the intermediate layer 11 and the upper layer 12, vacuum deposition or ion plating methods may also be employed in place of the vacuum sputtering or plasma CVD methods.

Thus, in the present embodiment, the intermediate layer 11 and the upper layer 12 formed of diamond-shaped carbon are sequentially layered on the air lubricating surface a on the upper surfaces of the slide rails of the slider 2. Since the intermediate layer 11 improves the adhesion between the upper layer 12 and the air lubricating surface a on the upper surface of the slider 2 on which the film is to be formed, it becomes possible to reduce the flying height to achieve high recording density. In addition, the abrasion or sticking which tends to be produced on the surface of the slider 2 or of the magnetic disc 5 when the slider 2 has sliding contact with the surface of the magnetic disc 5 immediately after start or stop of the slider 2 may be lowered significantly.

When fabricating the floating magnetic head device, the ionized inert gas is supplied to the air lubricating surfaces a on the slider 2 for effecting plasma etching. The intermediate layer 11 is then formed by the thin film forming technique and the surface of the intermediate film 11 thus formed is again etched using the inert gas for depositing the upper layer 12. The air lubricating surfaces a are cleaned and activated in this manner by the pre-treatment by the inert gas, and the intermediate layer 11 and the upper layer 12 are formed under this condition, thus further improving adhesion between the air lubricating surfaces a and the upper layer 12.

Several experimental examples are now explained in connection with the above-described embodiment.

The first experimental example is first explained. In the present first experimental example, CSS durability and electro-magnetic transducing characteristics in case of forming the intermediate layer 11 and the upper layer 12 from Si to various film thicknesses were checked, by way of experiment 1, while CSS durability of several intermediate layers 11, formed of different materials, were checked, by way of experiment 2.

Figure 4:
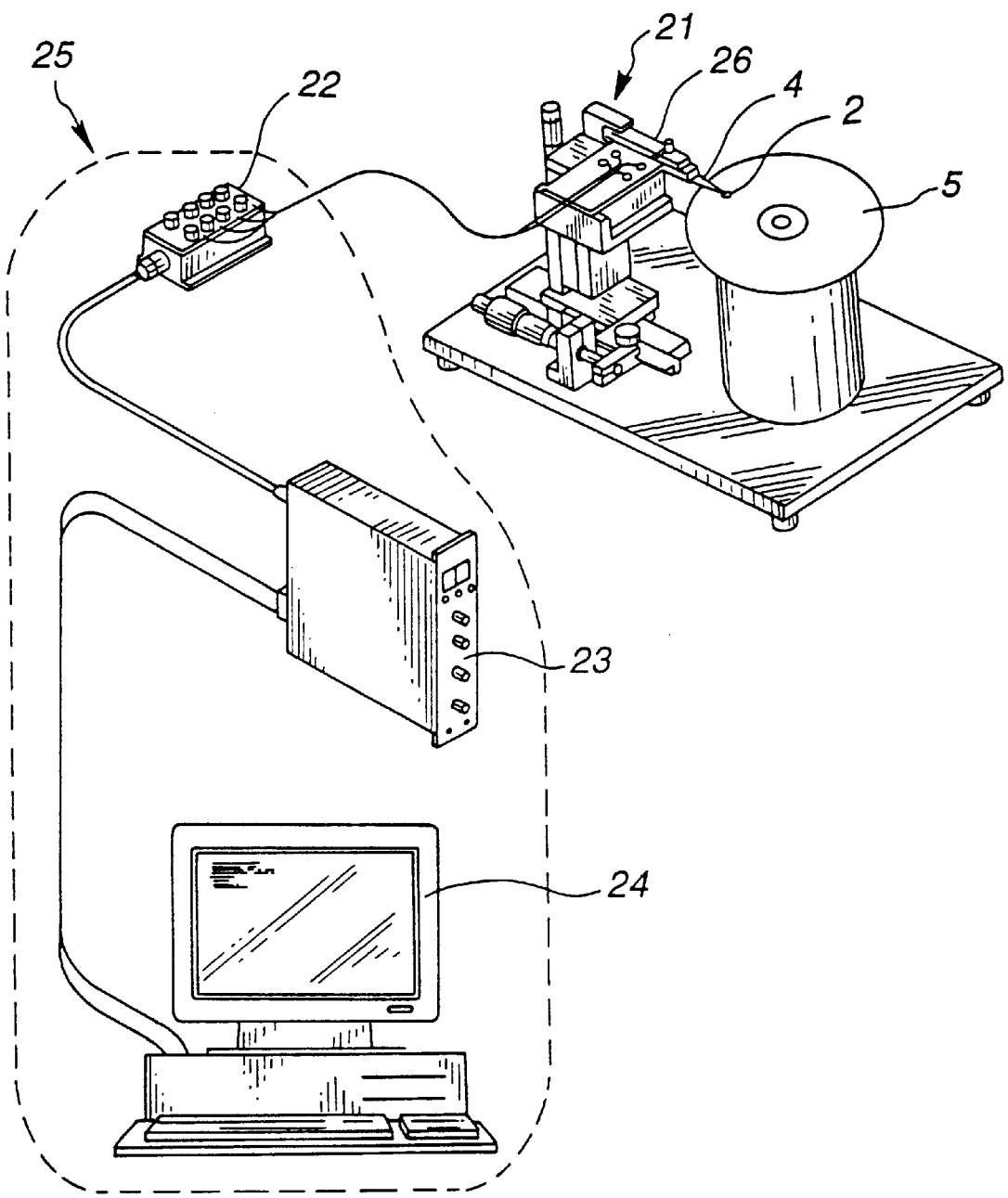
FIG. 4 is a schematic perspective view showing a CSS friction tester for measuring CSS durability.

The experiment 1 is first explained. For measuring the CSS durability, a CSS friction tester, as shown in FIG. 4, was used. This CSS friction tester includes a measurement unit 21, having a load cell, and an arithmetic unit 25, made up of a bridge 22, a strain amplifier 23 and a computer 24. The measurement unit 21 has on its arm 26 a slider 2 carrying the magnetic head element 1 mounted thereon via a suspension 4. The frictional force produced on sliding the slider 2 against the magnetic disc 5 is transduced by the load cell into an electrical output which is then amplified via bridge 22 by the strain amplifier 23 and converted by the computer 24 into a frictional coefficient for display. The number of times of the CSS operations until the fictional coefficient surpassed 0.5 was counted for evaluating the CSS durability.

In measuring the electro-magnetic conversion characteristics, a magnetic disc having Hc equal to 180 Oe and Brδ of 150 G μm was used, and a width PW50 when the height of the output waveform was one-half the playback output value for the recording frequency of 1 MHz was used as an index. The narrower the PW50, the more is the amount of the recordable information.

In the present experiment 1, samples 1 to 5 were prepared using the intermediate layers 11 having thicknesses of 0, 3, 10, 80 and 200 Å, respectively, with the upper layer 12 for each of the samples having a thickness of 100 Å, by way of an experiment A. Similarly, samples 6 to 10 were prepared, using the upper layers having the film thicknesses of 0, 5, 100 and 300 Å, with the film thickness of the intermediate layer 11 being 50 Å for the intermediate layer 11, and a sample 11 was prepared as a comparative example for the these samples 1 to 10 by not forming the intermediate layer 11 nor the upper payer 12, by way of an experiment B. The results of the CSS durability and electro-magnetic transducing characteristics in the experiment A are shown in Tables 1 and 2, while the results of the CSS durability and electro-magnetic transducing characteristics in the experiment B are shown in Tables 3 and 4.

TABLE 1

| sample Nos. | number of times of CSS | |
|---|---|---|
| 1 | 760 (damages occurred on magnetic disc) | NG |
| 2 | 4000 | NG |
| 3 | more than 20000 | OK |
| 4 | more than 20000 | OK |
| 5 | more than 20000 | OK |

TABLE 2

| sample Nos. | output (μVpp) | PW50 (μm) |
|---|---|---|
| 1 | not less than 400 | not more than 0.55 |
| 2 | not less than 400 | not more than 0.55 |
| 3 | not less than 400 | not more than 0.55 |
| 4 | not less than 400 | not more than 0.55 |
| 5 | 270 | 0.62 |

TABLE 3

| sample Nos. | number of times of CSS | judgment |
|---|---|---|
| 6 | 15000 | NG |
| 7 | 18000 | NG |

TABLE 3-continued

| sample Nos. | number of times of CSS | judgment |
|---|---|---|
| 8 | not less than 20000 | OK |
| 9 | not less than 20000 | OK |
| 10 | not less than 20000 | OK |
| 11 | 12000 | NG |

TABLE 4

| sample Nos. | output ($\mu$Vpp) | PW50 ($\mu$m) | judgment |
|---|---|---|---|
| 6 | not less than 400 | not more than 0.55 | OK |
| 7 | not less than 400 | not more than 0.55 | OK |
| 8 | not less than 400 | not more than 0.55 | OK |
| 9 | not less than 400 | not more than 0.55 | OK |
| 10 | 250 | 0.67 | NG |
| 11 | not less than 400 | not more than 0.55 | OK |

As shown in Tables 1 to 3, the number of times of CSS until the frictional coefficient exceeded 0.5 surpassed 20000 for samples 3 to 5 and 8 to 10, indicating that the CSS durability was highly satisfactory. Conversely, with the samples 1, 2, 6, 7 and 11, sufficient adhesion cannot be achieved and the frictional coefficient exceeded 0.5 for an earlier number of times of CSS such that sufficient CSS durability could not be achieved.

On the other hand, there were no significant changes in the measured values for the samples 1 to 4, 6 to 9 and 11, whereas both the output value and the PW50 value were lower for the samples 5 and 10.

It is seen from the above results that the film thicknesses of the intermediate layer 11 and the upper layer 12 are preferably within the ranges of 5 to 100 Å and 10 to 200 Å, respectively.

The experiment 2 is now explained. In the present experiment 2, the CSS durability was checked in the same way as in Experiment 1, using a CSS friction tester employed in Experiment 1. Samples 12 to 15 were prepared by setting the film thicknesses of the intermediate layer 11 and the upper layer 12 to 50 Å and 100 Å, respectively and by employing the intermediate layer 11 formed of Si, B, Al and C. In addition, samples 16 and 17 were prepared using Cr and Ta as Comparative Examples for these samples 12 to 15. The results of the experiment are shown in Table 5.

TABLE 5

| sample Nos. | intermediate layer | number of times of CSS | judgment |
|---|---|---|---|
| 12 | Si | not less than 20000 | OK |
| 13 | B | not less than 20000 | OK |
| 14 | Al | not less than 20000 | OK |
| 15 | C | not less than 20000 | OK |
| 16 | Cr | 14500 | NG |
| 17 | Ta | 13800 | NG |

Thus, with the samples 12 to 15, the number of CSS until the frictional coefficient surpassed 0.5 exceeded 20000, thus showing that CSS durability was highly satisfactory. Conversely, with the samples 16 and 17, sufficient adhesion cannot be achieved and the frictional coefficient exceeded 0.5 for an earlier number of times of CSS such that sufficient CSS durability could not be achieved.

It is seen from the above results that Si, B, Al and C may preferably be employed as materials for the intermediate layer 11.

The second experiment is now explained. In the present second experiment, CSS durability and electro-magnetic transducing characteristics in the case of employing the intermediate layer 11 and the upper layer 12 of $SiO_2$ of respective varying thicknesses were analyzed. The technique of measuring the CSS durability and electro-magnetic transducing characteristics is the same as that for the above-described first experiment.

In the present experiment 1, samples 21 to 25 were prepared using the intermediate layers 11 having thicknesses of 0, 3, 10, 80 and 200 Å, respectively, with the upper layer 12 for each of the samples having a thickness of 100 Å, by way of an experiment 1. Similarly, samples 26 to 30 were prepared, using the upper layers having the film thicknesses of 0, 5, 100 and 300 Å, with the film thickness of the intermediate layer 11 being 50 Å for the intermediate layer 11, and a sample 31 was prepared as a comparative example for the these samples 1 to 10 by not forming the intermediate layer 11 nor the upper payer 12, by way of an experiment 2. The results of the CSS durability and electro-magnetic transducing characteristics in the experiment 1 are shown in Tables 6 and 7, while the results of the CSS durability and electro-magnetic transducing characteristics in the experiment 2 are shown in Tables 8 and 9.

TABLE 6

| sample Nos. | number of times of CSS | |
|---|---|---|
| 21 | 760 (damages occurred on magnetic disc) | NG |
| 22 | 4000 | NG |
| 13 | more than 20000 | OK |
| 24 | more than 20000 | OK |
| 25 | more than 20000 | OK |

TABLE 7

| sample Nos. | output ($\mu$Vpp) | PW50 ($\mu$m) |
|---|---|---|
| 21 | not less than 400 | not more than 0.55 |
| 22 | not less than 400 | not more than 0.55 |
| 23 | not less than 400 | not more than 0.55 |
| 24 | not less than 400 | not more than 0.55 |
| 25 | 270 | 0.62 |

TABLE 8

| sample Nos. | number of times of CSS | judgment |
|---|---|---|
| 26 | 15000 | NG |
| 27 | 18000 | NG |
| 28 | not less than 20000 | OK |
| 29 | not less than 20000 | OK |
| 30 | not less than 20000 | OK |
| 31 | 12000 | NG |

TABLE 9

| sample Nos. | output ($\mu$Vpp) | PW50 ($\mu$m) | judgment |
|---|---|---|---|
| 26 | not less than 400 | not more than 0.55 | OK |
| 27 | not less than 400 | not more than 0.55 | OK |
| 28 | not less than 400 | not more than 0.55 | OK |
| 29 | not less than 400 | not more than 0.55 | OK |
| 30 | 250 | 0.67 | NG |
| 31 | not less than 400 | not more than 0.55 | OK |

As shown in Tables 6 to 8, the number of times of CSS until the frictional coefficient exceeded 0.5 surpassed 20000 for samples 23 to 25 and 28 to 30, indicating that the CSS durability was highly satisfactory. Conversely, with the samples 21, 22, 26, 27 and 31, sufficient adhesion could not be achieved and the frictional coefficient exceeded 0.5 for an earlier number of times of CSS such that sufficient CSS durability could not be achieved.

On the other hand, there were no significant changes in the measured values for the samples 21 to 24, 26 to 29 and 31, whereas both the output value and the PW50 value were lowered for the samples 25 and 30.

It is seen from the above results that the film thicknesses of the intermediate layer 11 and the upper layer 12 are preferably within the ranges of 5 to 100 Å and 10 to 200 Å, respectively.

What is claimed is:

1. A method for producing floating magnetic head in which a slider carrying a magnetic head is supported by a supporting member and in which an intermediate layer composed of group III or IV elements of the Periodic Table and an upper layer composed of hard carbon are sequentially layered at least on the surface of slide rails formed on the major surface of the slider operating as a floating surface, comprising the steps of:

supplying an ionized $H_2$ gas or an ionized inert gas to at least the surfaces of slider rails on the major surface of the slider constituting the floating surface of the slider for etching the slider rail surface;

forming said intermediate layer by a thin film forming technique;

etching the surface of the intermediate layer using an inert gas and depositing said upper layer on said intermediate layer by a thin film forming technique;

wherein, the intermediate layer is comprised of at least one of Si, B, Al and C and has a thickness of not less than 5 Å and not more than 100 Å, and the upper layer is diamond-shaped hard carbon, has a thickness of not less than 10 Å and not more than 200 Å and has a Vickers hardness of not less than 1000 Kgmm$^{-2}$.

2. The method as claimed in claim 1, wherein said inert gas is Ar.

3. The method as claimed in claim 1, wherein a plasma CVD, vacuum deposition, vacuum sputtering or ion plating methods is employed as the thin film forming technique.

4. A method for producing a floating magnetic head in which a slider carrying a magnetic head is supported by a supporting member and in which an intermediate layer composed of a silicon-based material and an upper layer composed of hard carbon are sequentially deposited at least on the surface of slide rails formed on the major surface of the slider operating as a floating surface, comprising the steps of:

supplying an ionized H2 gas or an ionized inert gas to at least the surfaces of slider rails on the major surface of the slider constituting the floating surface of the slider for etching the slider rail surface;

forming said intermediate layer by a thin film forming technique;

etching the surface of the intermediate layer using an inert gas and depositing said upper layer on said intermediate layer by a thin film forming technique;

wherein, said intermediate layer is composed of at least one of $SiO_2$, SiC, SiO and $Si_3N_4$ and has a thickness of not less than 5 Å and not more than 100 Å, and said upper layer comprises diamond-shaped hard carbon, has a thickness of not less than 10 Å and not more than 200 Å and a Vickers hardness of not less than 1000 Kgmm$^{-2}$.

5. The method as claimed in claim 4, wherein said inert gas is Ar.

6. The method as claimed in claim 4, wherein a plasma CVD, vacuum deposition, vacuum sputtering or ion plating methods is employed as the thin film forming technique.

* * * * *